United States Patent [19]
Shaw

[11] 3,801,372
[45] Apr. 2, 1974

[54] FUEL CELL SYSTEM COMPRISING SEPARATE COOLANT LOOP AND SENSING MEANS

[75] Inventor: Robert H. Shaw, Ellington, Conn.

[73] Assignee: United Aircraft Corporation, East Hartford, Conn.

[22] Filed: Aug. 18, 1971

[21] Appl. No.: 172,653

[52] U.S. Cl. ............................................. 136/86 B
[51] Int. Cl. ..................... H01m 27/00, H01m 27/14
[58] Field of Search ............... 136/86 R, 86 B, 86 C

[56] References Cited
UNITED STATES PATENTS

| | | | |
|---|---|---|---|
| 3,172,784 | 3/1965 | Blackmer | 136/86 E |
| 3,255,046 | 6/1966 | Ghormley | 136/86 C |
| 3,411,951 | 11/1968 | Gelting | 136/86 R |
| 3,531,326 | 9/1970 | Stanbavish | 136/86 E |

Primary Examiner—A. B. Curtis
Assistant Examiner—H. A. Feeley
Attorney, Agent, or Firm—A. W. Breiner

[57] ABSTRACT

A fuel cell system comprising a fuel cell stack, a pressurized reactant supply, and a circulating coolant, in which the coolant is circulated by a hydrostatic pump is described. The hydrostatic pump is created by introducing a gaseous reactant into one leg of a coolant loop, thereby decreasing the density of the coolant and providing a hydrostatic head to circulate the coolant. The pump has no moving parts, eliminating a source of potential mechanical failure.

4 Claims, 1 Drawing Figure

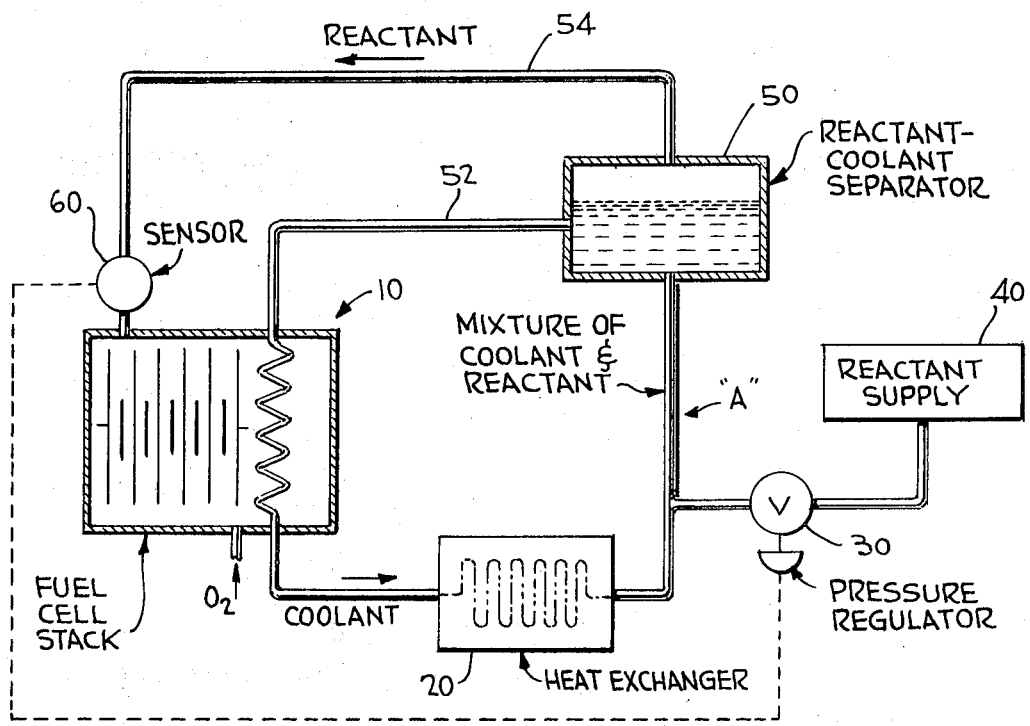

FUEL CELL SYSTEM COMPRISING SEPARATE COOLANT LOOP AND SENSING MEANS

FIELD OF INVENTION AND BACKGROUND

This invention relates to a fuel cell system for the generation of electrical energy of the type which utilizes a fuel cell stack in combination with a circulating coolant for removal of waste heat generated during operation of the system. More particularly, it is directed to a fuel cell system utilizing a hydrostatic pump for circulating a coolant. The pump has no moving parts, eliminating a source of potential mechanical failure in the fuel cell system.

A fuel cell, as the term is employed herein, designates an electrochemical cell for the direct generation of electrical energy from a fuel and oxidant. With such cells it is not necessary to go through the usual conversion of chemical energy to heat energy to mechanical energy to electrical energy as is common with heat engines. Such cells in their most simplified design comprise a housing, an oxidant electrode, a fuel electrode, and an electrolyte. In operation, it is necessary that the fuel and oxidant contact a surface of their respective electrodes where a process of adsorption and desorption occurs leaving the electrodes electrically charged, with the second surface of the electrodes being in contact with the electrolyte. Depending upon the nature of the electrolyte, ions are transferred through the electrolyte from the anode to the cathode, or from the cathode to the anode. Electrical current is withdrawn from the cell and passed through a suitable load where work is accomplished.

In operation of a fuel cell system, it is generally necessary to control the operating temperature of a fuel cell stack for efficient operation. More specifically, heat generally must be supplied during start-up and heat removed after the cell is operating normally. A convenient means of accomplishing heat-transfer in a fuel cell system is the incorporation of a coolant loop within the system whereby a fluid such as ethylene glycol is circulated through the cell stack in heat-exchange relation with cooling plates or the like, through a heat-exchange element to adjust the temperature of the coolant with the rate of coolant flow being dependent upon the amount of heat to be added or removed from the cell stack. In the prior art systems, the coolant is circulated by means of a mechanical pump driven by an electrical motor. Since both the pump and motor have moving parts, they are sources of potential mechanical failure in the over-all system.

OBJECTS AND GENERAL DESCRIPTION

Accordingly, it is an object of the present invention to provide a fuel cell system including a pump free of mechanical parts.

It is another object of this invention to provide a fuel cell system including a circulating coolant which eliminates need for a mechanical pump for the coolant circulation.

It is another object of this invention to provide a fuel cell system utilizing a hydrostatic pump to circulate coolant through the fuel cell stack.

It is another object of this invention to provide a fuel cell system including a fuel cell stack and coolant loop in which the rate of coolant flow is directly controlled and proportional to the reactant flow into the fuel cell stack.

These and other objects of the invention will be more readily apparent from the following detailed description, with particular emphasis being placed on the drawing.

The invention whereby the aforesaid objects are accomplished will be described with reference to the drawing. As seen from the drawing, a fuel cell system of the type under consideration herein comprises a fuel cell stack utilizing a circulating coolant. Essential components of the system constructed and arranged in a continuous loop are fuel cell stack 10, heat-transfer means 20 for addition or removal of heat energy from the coolant, valve 30 for injecting a reactant from reactant supply 40 into the coolant at one leg of the loop, i.e., the portion of the loop set off in heavy lines and marked with the letter A; and reactant and coolant separator means 50.

In operation of the fuel cell system, reactant is fed to the fuel cell stack on demand from a reactant supply as controlled by reactant sensor 60 in functional relationship with the fuel cell stack, i.e., the reactant feed is controlled by the sensor in relation to current and voltage characteristics. The gaseous reactant is injected directly into the coolant from the reactant supply through pressure regulator 30. The gaseous reactant going into the coolant decreases the density of the coolant, providing a hydrostatic head to circulate the coolant through the loop. The reactant and coolant are gravity separated, with the coolant and reactant being fed to the fuel cell stack by conduit means 52 and 54, respectively. Inasmuch as the hydrostatic head circulating the coolant is directly proportional to the gaseous reactant which is injected into the coolant, the coolant flow will be directly proportional to the reactant which goes into the cell stack and, accordingly, directly proportional to the amount of electrical energy being produced. As a result, the control of the heat removal from the cell stack is readily accomplished.

As will be apparent, the reactant which is charged to the coolant can be either the fuel or oxidant. It is only essential that the reactant be in the gaseous state when injected into the coolant. Normally, however, in view of the more exact control associated with the fuel, it is preferable to inject the fuel into the coolant. The reactant flow is maintained by the elevated pressure in the supply system.

The present invention provides a simple, convenient, and accurate method of controlling the heat-transfer within a fuel cell system without need of mechanical pump and ancillary equipment associated with mechanical pumps such as electrical motors. Additionally, since the rate of coolant flow is directly proportional to the reactant being consumed in the fuel cell stack, e.g., the injection of gaseous reactant being in direct proportion to the current and/or voltage demands on the fuel cell stack, extremely accurate control of the system temperature is realized without need for expensive ancillary control means.

As will be readily apparent to one skilled in the art, the present invention can be practiced utilizing fuel cells commonly known in the prior art, or can be incorporated in prior art fuel cell systems. For example, the invention can be readily adapted to a system such as defined in Gelting U.S. Pat. No. 3,411,951, commonly assigned, which utilizes a humidity exchange/scrubber unit in combination with a fuel cell stack and coolant loop. Furthermore, as will be apparent to one skilled in the art, various modifications can be made in the overall design of the system to meet varying requirements and conditions. These modifications being within the ability of one skilled in the art are to be covered herein, with the invention only being limited in accordance with the appended claims.

I claim:

1. In a fuel cell system comprising a fuel cell stack comprising a plurality of fuel cells having an anode, cathode, and an electrolyte, a reactant supply for feeding a gaseous reactant to said fuel cell stack, and a heat-exchange coolant loop for circulating a coolant separate from the said electrolyte of said plurality of fuel cells constructed and arranged in operative association with said fuel cell stack, the improvement comprising means for injecting said gaseous reactant from said reactant supply into one leg of the coolant loop, thereby decreasing the density of the coolant therein and providing a hydrostatic head for circulating said coolant; reactant-coolant separator means for continuously separating reactant from said coolant, means for continuously feeding separated reactant from said separator to said fuel cell stack and means for continuously feeding said coolant to said fuel cell stack, the means for injecting gaseous reactant into the reactant loop being controlled by a sensor associated with the fuel cell stack for regulating the flow of reactant to the cell stack by current and/or voltage characteristics and thereby regulating the coolant flow.

2. The fuel cell system of claim 1 further characterized in that the reactant/coolant separator means is a gravity separator.

3. The method of generating electrical energy in a fuel cell system comprising a fuel cell stack comprising a plurality of fuel cells having an anode, cathode, and an electrolyte, a gaseous reactant supply for said fuel cell stack and a coolant loop for circulating a coolant separate from said electrolyte of said plurality of fuel cells for controlling the heat of said fuel cell stack, comprising the steps of injecting gaseous reactant from the reactant supply directly into the coolant flowing in said coolant loop at one leg of said coolant loop thereby decreasing the density of the coolant and creating a hydrostatic head for circulating the coolant; separating said reactant and coolant and feeding said separated reactant directly to the fuel cell stack and circulating said coolant to said fuel cell stack, the injection of the gaseous reactant into the coolant being in direct proportion to the current and/or voltage demands on the fuel cell.

4. The method of claim 3 wherein the reactant coolant separation is by gravity.

\* \* \* \* \*